United States Patent
Kim et al.

(10) Patent No.: US 7,873,609 B2
(45) Date of Patent: Jan. 18, 2011

(54) CONTENTS DISTRIBUTION MANAGEMENT SYSTEM WITH MULTI-SERVICE TYPE MANAGEMENT FUNCTION AND METHOD THEREOF

(75) Inventors: Chang-Soo Kim, Daejon (KR); Seung-Jo Bae, Daejon (KR); Jin-Mee Kim, Daejon (KR); Yu-Hyeon Bak, Daejon (KR); Sang-Min Woo, Daegu (KR); Seung-Hyub Jeon, Jeju-do (KR); Won-Jae Lee, Daejon (KR); Hag-Young Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 306 days.

(21) Appl. No.: 11/312,053

(22) Filed: Dec. 20, 2005

(65) Prior Publication Data
US 2006/0155779 A1    Jul. 13, 2006

(30) Foreign Application Priority Data
Dec. 20, 2004    (KR)    .................... 10-2004-0108973

(51) Int. Cl.
*G06F 7/00* (2006.01)
*G06F 17/00* (2006.01)
*G06F 12/00* (2006.01)
*G06F 17/30* (2006.01)
*G06F 15/16* (2006.01)

(52) U.S. Cl. .................. 707/694; 707/827; 707/999.01; 707/999.2; 707/E17.01; 707/E17.12; 709/203

(58) Field of Classification Search ................ 707/204, 707/748, 751, 754, E17.12
See application file for complete search history.

(56) References Cited

U.S. PATENT DOCUMENTS 6,081,840  A  *  6/2000  Zhao ........................ 709/224
6,651,141  B2 * 11/2003  Adrangi .................... 711/118
6,785,704  B1 *  8/2004  McCanne .................. 718/105

(Continued)

FOREIGN PATENT DOCUMENTS

KR    1995 022384    7/1995

(Continued)

OTHER PUBLICATIONS

Satish Menon; "Video Content Distribution" Kasenna Technical White Paper, pp. 1-7.

*Primary Examiner*—Mohammad Ali
*Assistant Examiner*—Griselle Corbo
(74) *Attorney, Agent, or Firm*—Ladas & Parry LLP

(57) ABSTRACT

Provided is a contents distribution management system and method for supporting a plurality of global servers that provide the contents and managing the contents by applying different policies based on the global server and service type of the contents. The inventive system comprises a plurality of global servers for supplying contents to a plurality of local servers, each global server having a large capacity contents library, and the local servers for managing the contents provided from the global servers based on global servers and service types using contents tables, and providing a contents service in response to a contents streaming service demand from a last terminal using a local contents cache.

20 Claims, 9 Drawing Sheets

U.S. PATENT DOCUMENTS

| | | | | |
|---|---|---|---|---|
| 6,947,935 | B1* | 9/2005 | Horvitz et al. | 1/1 |
| 7,073,073 | B1* | 7/2006 | Nonaka et al. | 713/193 |
| 7,181,523 | B2* | 2/2007 | Sim | 709/226 |
| 2001/0051980 | A1* | 12/2001 | Raciborski et al. | 709/203 |
| 2002/0038360 | A1* | 3/2002 | Andrews et al. | 709/223 |
| 2002/0133491 | A1* | 9/2002 | Sim et al. | 707/10 |
| 2002/0143798 | A1* | 10/2002 | Lisiecki et al. | 707/200 |
| 2002/0147770 | A1* | 10/2002 | Tang | 709/203 |
| 2003/0051251 | A1* | 3/2003 | Sugimoto et al. | 725/95 |
| 2003/0061451 | A1* | 3/2003 | Beyda | 711/137 |
| 2003/0149737 | A1* | 8/2003 | Lambert et al. | 709/214 |
| 2004/0172474 | A1* | 9/2004 | Markaryan et al. | 709/228 |
| 2005/0055426 | A1* | 3/2005 | Smith et al. | 709/219 |
| 2005/0071496 | A1* | 3/2005 | Singal et al. | 709/232 |
| 2006/0037037 | A1* | 2/2006 | Miranz | 725/2 |
| 2006/0106807 | A1* | 5/2006 | DeVitis et al. | 707/10 |
| 2006/0129766 | A1* | 6/2006 | Cassia et al. | 711/137 |
| 2006/0206565 | A1* | 9/2006 | Ganesan et al. | 709/204 |
| 2006/0208074 | A1* | 9/2006 | Eglen et al. | 235/383 |
| 2006/0218218 | A1* | 9/2006 | Ganesan et al. | 709/200 |
| 2007/0136487 | A1* | 6/2007 | Woo et al. | 709/231 |
| 2007/0136533 | A1* | 6/2007 | Church et al. | 711/137 |
| 2007/0180486 | A1* | 8/2007 | Yoon | 725/115 |
| 2008/0109343 | A1* | 5/2008 | Robinson et al. | 705/37 |
| 2009/0234861 | A1* | 9/2009 | Ramer et al. | 707/10 |

FOREIGN PATENT DOCUMENTS

| | | |
|---|---|---|
| KR | 2001-0009728 | 2/2001 |
| KR | 2003 0027485 | 4/2003 |

* cited by examiner

FIG. 3

| GLOBAL SERVER ID | CONTENTS ID | CONTENTS TITLE | GLOBAL PATH | RELEASE DATE | FILE SIZE | SERVICE TYPE | USAGE | BIT RATE | RUNNING TIME | ... |
|---|---|---|---|---|---|---|---|---|---|---|
| | | | | | | | | | | |
| | | | | | | | | | | |

FIG. 4

| GLOBAL SERVER ID | CONTENTS ID | NODE ID | LOCAL PATH | CONTENT STATE | LAST ACCESS TIME | STORED TIME | TOTAL NUMBER OF SERVICES | NUMBER OF CURRENT SIMULTANEOUS SERVICES | ORIGINAL FILE SIZE | CURRENT FILE SIZE | SERVICE TYPE | ... |
|---|---|---|---|---|---|---|---|---|---|---|---|---|
| | | | | | | | | | | | | |
| | | | | | | | | | | | | |

FIG. 5

| SERVICE NAME | GLOBAL SERVER ID | SERVICE TYPE | PURGING POLICY | PLACEMENT POLICY | PRELOADING POLICY | MAXIMUM SPACE RATE |
|---|---|---|---|---|---|---|
| | | | | | | |
| | | | | | | |

FIG. 6

| SERVICE NAME | NODE ID | CURRENT USAGE SPACE | RESERVED USAGE SPACE | MAXIMAL USABLE SPACE |
|---|---|---|---|---|
| | | | | |
| | | | | |

CONTENTS DISTRIBUTION MANAGEMENT SYSTEM WITH MULTI-SERVICE TYPE MANAGEMENT FUNCTION AND METHOD THEREOF

CROSS-REFERENCE TO RELATED APPLICATIONS

The present application claims priority under 35 U.S.C 119(a) to Korean Application No. 10-2004-0108973, filed on Dec. 20, 2004, in the Korean Intellectual Property Office, which is incorporated by reference in its entirety as set forth in full

FIELD OF THE INVENTION

The present invention relates to a contents distribution management system; and more particularly, to a contents distribution management system and method for supporting a plurality of global servers that provide the contents and managing the contents by applying different policies based on the global server and service type of the contents.

DESCRIPTION OF RELATED ART

An available bandwidth in a conventional wide area network is not sufficient to support a remote play of large-capacity contents such as video due to such problems as latency time, jitter and limited throughput. Hence, to solve the above problems, a conventional system is constructed in such a way that a plurality of local servers are provided at locations geographically dispersed and a large capacity contents file cache is incorporated in each of them to offer a proper rapid access to widely dispersed users.

FIG. 1 is a view showing a configuration of a general contents distribution system.

As shown therein, the conventional contents distribution system includes a contents library 110, a global server 100, a plurality of local servers 140, and local caches 150.

Contents are installed in the contents library 110, and a whole copy or a partial copy of contents frequently used by users is stored in the local cache 150.

Therefore, when a user demands contents of the local server 140 via a local area network, the local server 140 searches whether or not the contents demanded by the user are stored in the local cache 150.

If the contents demanded by the user are stored in the local cache 150, the local server 140 reads the contents from the local cache 150 and transmits them to the user via the local area network.

However, if the contents demanded by the user are not stored in the local cache 150, the local server 140 demands the contents demanded by the user of the global server 100 via a wide area network.

As described above, when the local server 140 demands the contents of the global server 100, the global server 100 reads the contents demanded by the user from the contents library 110 and transmits it to the local server 140 via the wide area network. And then, the local server 140 transmits the contents provided from the global server 100 to the user via the local area network.

However, the conventional contents distribution management system as shown in FIG. 1 has only one global server 100 that supplies the contents to the local server 140 that offers the contents service to end users. This is because the local server 140 cannot identify contents if it accepts those contents from multiple global servers.

Moreover, in the conventional contents distribution management system, there may be a variety of service types of contents, e.g., video, educational video, news, etc., which are serviced from the local server 140 to the end user. However, since such prior art system manages those contents just as they are ones of the same type, it cannot apply a different management method that depends on a type of services or characteristics corresponding to each of the contents.

SUMMARY OF THE INVENTION

It is, therefore, an object of the present invention to provide a contents distribution management system and method for supporting a plurality of global servers that provide the contents and managing the contents by applying different policies based on the global server and service type of the contents.

In accordance with one aspect of the present invention, there is provided a contents distribution management system with a multi-service type management function, the system comprising: a plurality of global servers for supplying contents to a plurality of local servers, each global server having a large capacity contents library; and the local servers for managing the contents provided from the global servers based on global servers and service types using contents tables, and providing a contents service in response to a contents streaming service demand from a last terminal using a local contents cache.

In accordance with another aspect of the present invention, there is provided a multi-service type management method in a contents distribution management system, the method comprising the steps of: (a) when an addition of a service is demanded, adding one row or one directory to each of a contents storage policy table, a local contents cache and a storage management table; (b) when an elimination of a service is demanded, eliminating a corresponding one row or one directory from each of the contents storage policy table, and the local contents cache and the storage management table; (c) when a change of a service is demanded, changing field values of a corresponding row in each of the contents storage policy table, and the storage management table; (d) if contents demanded from a last terminal are not presented in the local contents cache, securing a space required by the local contents cache to receive the corresponding contents; and (e) preloading a head part of contents to store the head part in the local contents cache.

The other objectives and advantages of the invention will be understood by the following description and will also be appreciated by the embodiments of the invention more clearly. Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description of preferred embodiments taken in conjunction with the accompanying drawings, in which:

FIG. 3 is a structural view showing a global contents table (GCT) of the global server and the local server in accordance with an embodiment of the present invention;

FIG. 4 is a structural view showing a local contents table (LCT) of the local server in accordance with an embodiment of the present invention;

FIG. 5 is a structural view showing a contents storage policy table (CSPT) of the local server in accordance with an embodiment of the present invention;

FIG. 6 is a structural view depicting a storage management table (SMT) of the local server in accordance with an embodiment of the present invention;

DETAILED DESCRIPTION OF THE INVENTION

The above-mentioned objectives, features, and advantages will be more apparent by the following detailed description associated with the accompanying drawings; and based on this, the invention will be readily conceived by those skilled in the art to which the invention belongs. Further, in the following description, well-known arts will not be described in detail if it seems that they could obscure the invention in unnecessary detail. Hereinafter, a preferred embodiment of the present invention will be set forth in detail with reference to the accompanying drawings.

Figure 1:
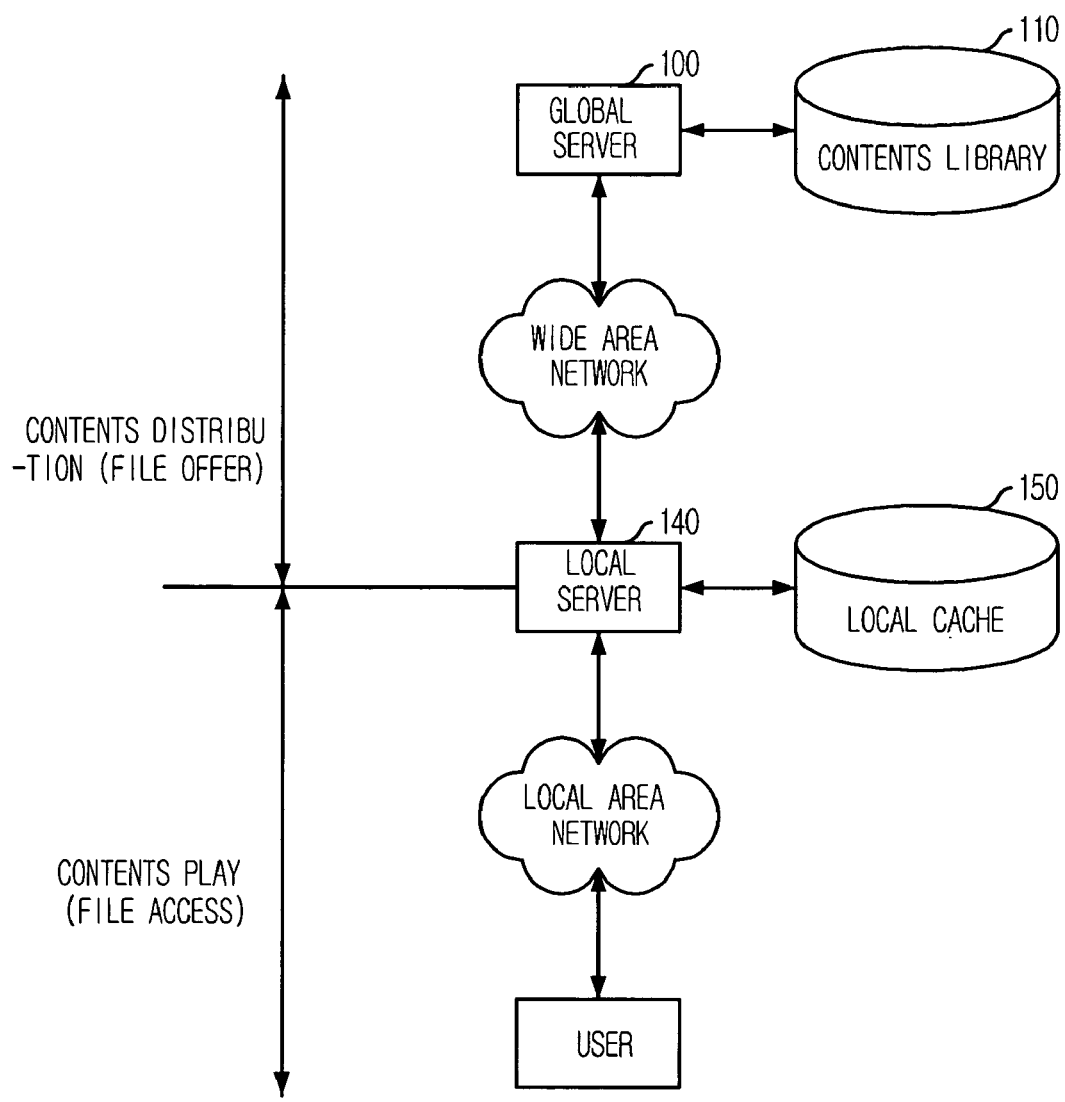
FIG. 1 is a view showing a configuration of a conventional contents distribution system.
Figure 2:
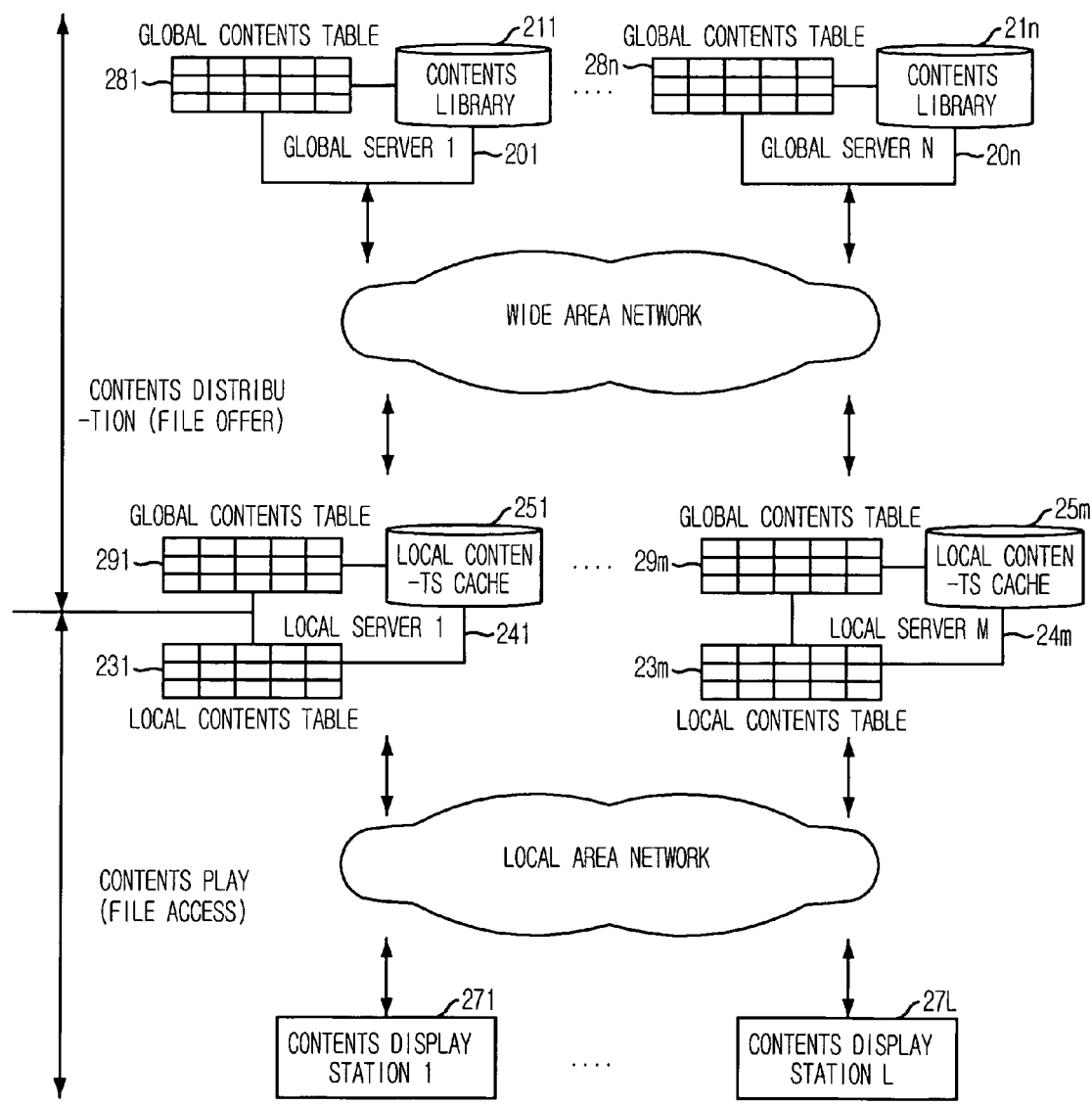
FIG. 2 is a view illustrating a contents distribution management system having a multi-service type management function in accordance with an embodiment of the present invention.

FIG. 2 is a view illustrating one embodiment of a contents distribution management system having a multi-service type management function in accordance with the present invention.

As shown in FIG. 2, the contents distribution management system having the multi-service type management function of the present invention comprises a plurality of global servers $20l$ to $20n$ and a plurality of local servers $24l$ to $24m$.

The global servers $20l$ to $20n$ include their own large capacity contents libraries $21l$ to $21n$ where contents are installed and Global Contents Tables (GCTS) $28l$ to $28n$ to manage information on contents they can provide.

These global servers $20l$ to $20n$ are connected to the local servers $24l$ to $24m$ via a wide area network, and transmit contents they have to the local servers $24l$ to $24m$.

Each of the local servers $24l$ to $24m$ is provided with a corresponding one of local contents caches $25l$ to $25m$. Further, each local server includes a corresponding one of GCTs $29l$ to $29m$ that store information on contents that are planning to lastly provide services to users among information on contents acquired from the global servers $20l$ to $20n$, and a corresponding one of Local Contents Tables (LCTS) $23l$ to $23m$ that store information about contents stored in the local contents caches $25l$ to $25m$ within the local servers $24l$ to $24m$.

In this structure, each of the local servers $24l$ to $24m$ manages a separate one of GCTs $29l$ to $29m$ distinguishable from the GCTs $28l$ to $28n$ managed by the global servers $20l$ to $20n$. Therefore, the local servers $24l$ to $24m$ don't offer contents provided by the global servers $20l$ to $20n$ to the end user unconditionally, but can selectively determine desired contents to be provided to the end user among the contents provided from the global servers $20l$ to $20n$.

Thus, the local servers $24l$ to $24m$ manage the contents provided from the global servers $20l$ to $20n$ by means of sorting them by the global servers $20l$ to $20n$ using the GCTs $29l$ to $29m$, thereby classifying them by the global servers $20l$ to $20n$.

Further, each of the local servers $24l$ to $24m$ is coupled with contents display stations $27l$ to $27L$ used by the end user via a local area network. Each of the local servers $24l$ to $24m$ provides a contents streaming service to the end user using the local contents caches $25l$ to $25m$ when the end user demands the contents streaming service via the contents display stations $27l$ to $27L$.

And also, each of the local servers $24l$ to $24m$ as shown in FIG. 2 may be extended in the form of a general cluster to enhance performance, scalability and availability. For the convenience of explanation, in the following description, it will be assumed and described that each of the local servers $24l$ to $24m$ is of a conventional single node type where not necessary.

FIG. 3 offers a structural view showing one embodiment of the GCT of the global server and the local server in accordance with the present invention.

As shown in FIG. 3, the GCT of the global server and the local server of the invention is a table that is simultaneously maintained and managed in each of the global servers $20l$ to $20n$ and the local servers $24l$ to $24m$. The GCTs $28l$ to $28n$ in the global servers $20l$ to $20n$ are to manage contents they have; and the GCTs $29l$ to $29m$ in the local servers $24l$ to $24m$ are to manage contents come from the global servers $20l$ to $20n$ into their own local caches $25l$ to $25m$ according to the global servers, and also manage contents to be finally serviced to the end user.

Meanwhile, the GCTs $28l$ to $28n$ and $29l$ to $29m$ contain a global server identification (ID) to identify each of the global servers $20l$ to $20n$, a contents ID to identify each contents, a contents title, a global path indicating a storage location of contents in each global server, a contents size representing a final size of contents, a service type representing a service type of contents, a usage frequency indicating a usage trend of contents, a bit rate indicating a transmission rate required when a contents is played to the end user at a real time, a total running time of contents, etc.

FIG. 4 presents a structural view showing one embodiment of the LCT of the local server in accordance with the present invention.

As shown in FIG. 4, the LCT of the local server in accordance with the present invention is a table that is maintained and managed in only each of the local servers $24l$ to $24m$ and contains a global server ID to identify each of the global servers $20l$ to $20n$, a contents ID to identify contents, a specific node ID to identify a node or local server in a cluster if the local server is made in the cluster form, a storage location in the local servers $24l$ to $24m$, a current state of contents, a lastly serviced time or last access time, a time stored in the local servers $24l$ to $24m$, a total number of services or accesses, the number of end users who currently get services, a final size of original files, a size of contents currently maintained in the local servers $24l$ to $24m$, a service type of contents, and so on.

Here, the current state of contents indicates information on whether the current contents are being transmitted from the global servers 20*l* to 20*n*, are being eliminated or purged for storage space management in the local servers 24*l* to 24*m*, or are being serviced to the end user.

FIG. 5 represents a structural view showing one embodiment of a Contents Storage Policy Table (CSPT) of the local server in accordance with the present invention.

As shown in FIG. 5, the CSPT of the local server in accordance with the present invention is a table that is maintained and managed in only each of the local servers 24*l* to 24*m*. As described above, in accordance with the invention, each of the local servers 24*l* to 24*m* utilizes the local contents caches 25*l* to 25*m* prepared in the corresponding local servers 24*l* to 24*m* to provide the contents streaming service to the end user having the contents display stations 27*l* to 27L. If complete contents are not within the corresponding local contents caches 25*l* to 25*m*, each local server receives whole contents if contents are not presented in the local contents caches 25*l* to 25*m* at all, or the latter half of the contents if the head part of the contents is presented in the local contents caches 25*l* to 25*m* via the specific global servers 20*l* to 20*n* providing the relevant contents among the global servers 20*l* to 20*n*.

At this time, each of the global servers 20*l* to 20*n* has a different profit method for transmitting contents to the local servers 24*l* to 24*m*.

For example, any of the global servers 20*l* to 20*n* may have a monthly fixed amount type profit structure that makes a fixed amount of money every month and another server may get a fixed amount profit whenever it provides contents.

And also, each of the global servers 20*l* to 20*n* may have a different profit structure depending on a service type of contents provided by its own server. Hence, each of the global servers 20*l* to 20*n* should apply a different management policy based on a service type.

In the meantime, although the global servers 20*l* to 20*n* don't apply different management policies based on a service type, there exists an instance where the local servers 24*l* to 24*m* apply separate storage management policies depending on each service type.

For instance, when the local servers 24*l* to 24*m* receives contents transmitted from the global servers 20*l* to 20*n*, there may sometimes be an instance where lack of space exists in the local contents caches 25*l* to 25*m* of the local servers 24*l* to 24*m*. In this case, it needs to eliminate or purge the latter half or whole of contents stored in the local contents caches 25*l* to 25*m* to secure the space of the local contents caches 25*l* to 25*m*.

At this time, the storage management policy to which the local servers 24*l* to 24*m* apply to guarantee the space of the local contents caches 25*l* to 25*m* is different depending on a service type of contents transmitted from the global servers 20*l* to 20*n*.

If a service type of contents from the global servers 20*l* to 20*n* is "movie," contents to be eliminated may be selected by applying a Least Recently Used (LRU) algorithm that selects contents having the least frequency recently demanded from the user.

Meanwhile, if a service type of contents from the global servers 20*l* to 20*n* is "news," an algorithm that chooses old contents depending on a release date or stored time may be adopted, rather than the LRU algorithm, to select contents to be eliminated.

The present invention, which takes into account the above principle, allows the local servers 24*l* to 24*m* to apply different management policies based on the global servers 20*l* to 20*n* providing the contents and the service type thereof to manage the contents by using the CSPT as shown in FIG. 5.

As shown in FIG. 5, the service name in the CSPT of the local server in accordance with the present invention represents a name of service that is given based on the global servers 20*l* to 20*n* and the service type of contents provided from the global servers 20*l* to 20*n*. On the other hand, if a new service is added, a directory having a same name as the service name is created in the local contents caches 25*l* to 25*m* of the local servers 24*l* to 24*m*.

Further, the global ID represents a global server ID of a relevant service and a service type implies a service type of contents corresponding to the relevant service.

The elimination or purging policy is a policy, which selects contents to be eliminated when it needs to eliminate the latter half or whole of contents already presented in the local servers 24*l* to 24*m* for contents of a relevant service.

Typically, the elimination policy may be an LRU algorithm that selects contents that are not used for the longest time, a usage frequency algorithm that selects least serviced contents, namely contents having a least access number of LCT, an age algorithm that eliminates contents installed before the longest time, and a rank algorithm that selects contents having the lowest grade given thereto, namely contents having the lowest usage frequency of the GCTs 29*l* to 29*m*. In addition, other policies may be applied.

Further, the placement policy is a policy that may be used in case where the local servers 24*l* to 24*m* are composed in the cluster form, wherein it is determined whether specific contents will be stored in which node among plural nodes constituting the cluster when they are supplied from the global servers 20*l* to 20*n*.

This placement policy may be a storage policy that selects a node with the most storage space, a CPU policy that selects a node with the lowest CPU utilization, a network policy that chooses a node with the most spare network bandwidth, and a combined policy of network and CPU that considers the CPU utilization and network state simultaneously. In addition, other policies may be employed.

Meanwhile, when the end user having the contents display stations 27*l* to 27L is intended to demand a service of specific contents, if the local servers 24*l* to 24*m* to be serviced don't have the whole or head part of the contents, the end user cannot get the service until the local servers 24*l* to 24*m* load at least head part of the relevant contents in the local contents caches 25*l* to 25*m* of the local servers 24*l* to 24*m* via the global servers 20*l* to 20*n*.

This phenomenon may not cause any problem but may be any obstacle in providing a high level service. Hence, the contents distribution management system of the invention allows the local servers 24*l* to 24*m* to receive the head part of the contents in coincidence with a specific condition transmitted from the global servers 20*l* to 20*n* in advance and then store it in the local contents caches 25*l* to 25*m* in order to efficiently cope with the above circumstance.

The preloading policy of the CSPT shown in FIG. 5 is a policy that may be used in choosing contents to be transmitted from the global servers 20*l* to 20*n* in advance for the local servers 24*l* to 24*m* to provide a more superior service to the end user having the contents display stations 27*l* to 27L, as mentioned above.

A typical policy of the preloading policy may be a rank policy that selects contents having the highest grade given thereto, that is, contents having the highest usage frequency of the GCTs 23*l* to 23*m*, a newage policy that selects contents most recently installed, or a combined policy of newage and rank policies. And also, other policies may be adopted.

Lastly, the maximum space rate is a ratio of a total available storage space at which contents corresponding to each service are usable in the local servers 24*l* to 24*m* to a maximum available space.

FIG. 6 is a structural view depicting one embodiment of a Storage Management Table (SMT) of the local server in accordance with the present invention.

As shown in FIG. 6, the SMT of the local server in accordance with the present invention is a table that is maintained and managed in only the local servers 24*l* to 24*m*. A principal role of the SMT is to manage a storage space that is currently used for each service, a storage space to be used finally in case where all future transmissions are completed due to contents being currently received from the global servers 20*l* to 20*n*, and a maximum usable storage space for the relevant service. Based on the space management, the SMT is used in judging if a required storage space exists in case where specific contents are received from the global servers 20*l* to 20*n*.

The service name represents a service name given depending on the global servers 20*l* to 20*n* and a service type of contents provided from the relevant global servers 20*l* and 20*n*, in a same manner as that described in FIG. 5.

Further, the node ID is information to represent a specific node within the cluster in case where the relevant local servers 24*l* to 24*m* are made in the cluster form.

The current usage space indicates a storage space that is currently used in the local contents caches 25*l* to 25*m* of the local servers 24*l* to 24*m* for the service as mentioned above; and the reserved usage space is a storage space to be used in the local contents caches 25*l* to 25*m* for the service finally in case where all future transmissions are completed due to contents being currently received from the global servers 20*l* to 20*n*.

The maximum usable space or limit is a maximum storage space that can be used in the local contents caches 25*l* to 25*m* for the service and may be computed by multiplying a total capacity of the local contents caches 25*l* to 25*m* by the maximum space rate corresponding to the related service of the CSPT. The current usage space, the reserved usage space and the maximum usable space are classified and managed by nodes in case where the local servers 24*l* to 24*m* are made in the cluster form.

On the other hand, the local servers 24*l* to 24*m* create services and manage based on the global servers 20*l* to 20*n* providing contents and the service type of the contents by applying the appropriate management policies as described above.

Figure 7:
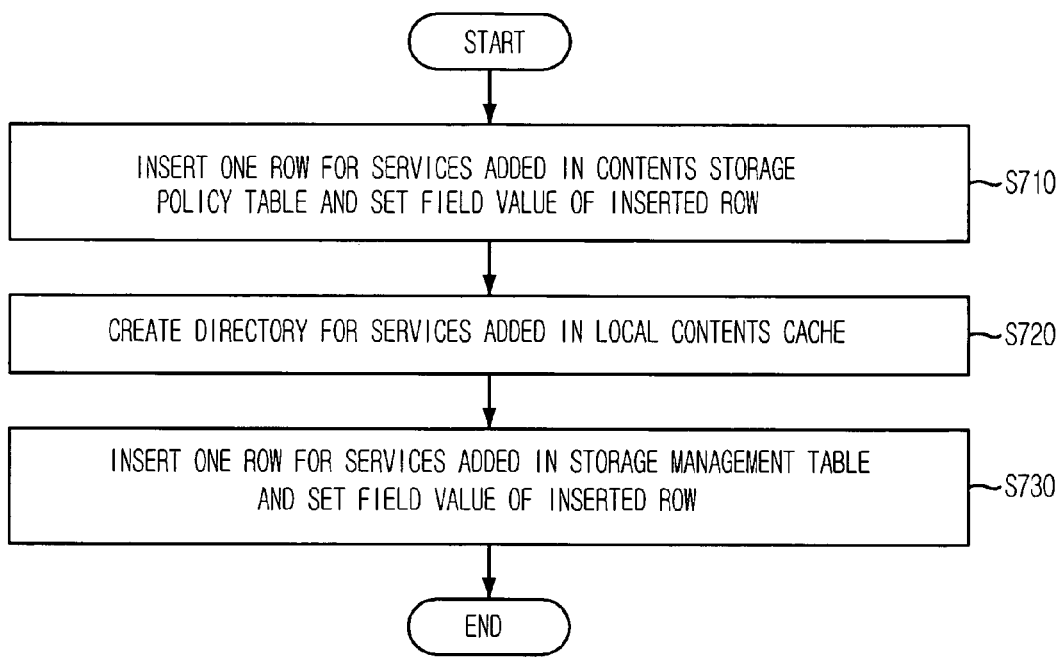
FIG. 7 is a flowchart describing a procedure of the contents distribution management system having the multi-service type management function upon addition of a service in accordance with an embodiment of the present invention.

FIG. 7 is a flowchart describing one embodiment of a procedure of the contents distribution management system having the multi-service type management function upon addition of a service in accordance with the present invention.

First of all, the manager should provide all requisite information for the CSPT when a service is added in the contents distribution management system.

Thereafter, when the contents distribution management system receives a demand for service addition from the end user, it inserts one row in the CSPT for a service to be added using the information provided from the manager and then sets field values of the inserted row using the information from the manager at step S710.

At a next step S720, the contents distribution management system creates a directory named as a service name referring to the information from the manager in the local contents caches 25*l* to 25*m* within the local servers 24*l* to 24*m*.

If the local servers 24*l* to 24*m* are consisted in the cluster form, the contents distribution management system performs the directory creation process at step S720 with respect to each node constituting the cluster.

As mentioned above, if the directory creation process has been completed, the contents distribution management system inserts one row in the SMT and then sets field values of the inserted row at step S730.

At this time, the contents distribution system makes the service name of the row newly inserted in the SMT same as that of the row inserted in the CSPT and then sets the current usage space and the reserved usage space to values of "0."

Further, the contents distribution management system sets the maximum usable space to the value computed by multiplying the total storage space of the local contents caches 25*l* to 25*m* by the maximum space rate of the CSPT.

If the local servers 24*l* to 24*m* are consisted in the cluster form, the contents distribution management system repeatedly inserts rows with respect to each node constituting the cluster.

As described above, if the new service type is added, the contents distribution management system inserts the new rows for the added service type in the CSPT and the SMT that are managed by the local servers 24*l* to 24*m* and then newly sets field values of the inserted rows using the information from the manager.

Figure 8:
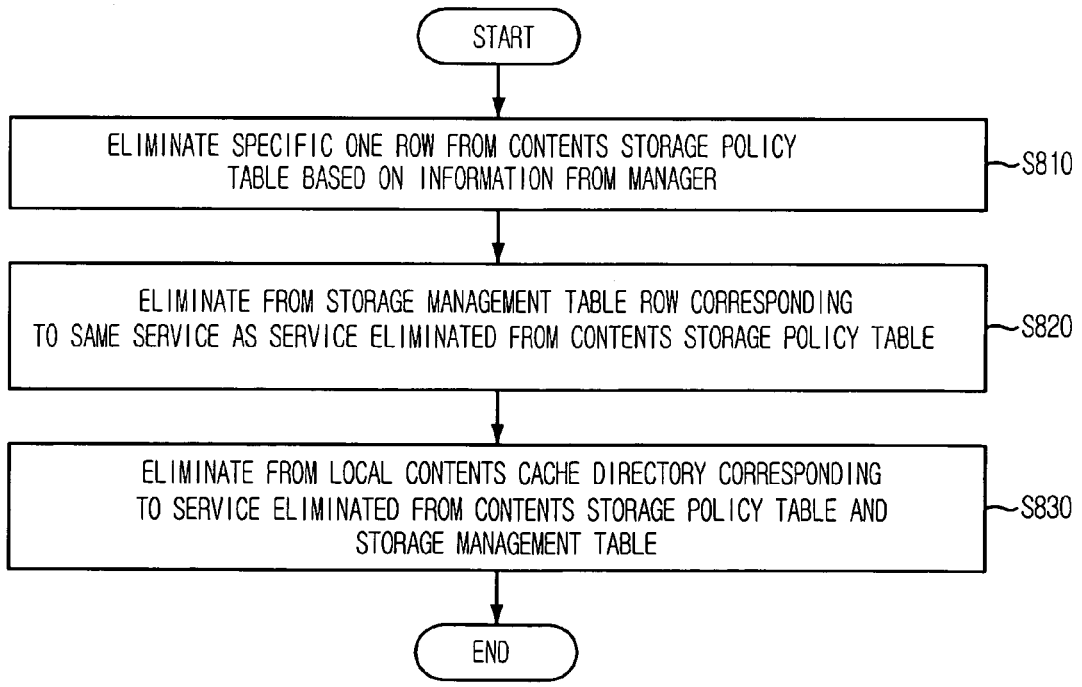
FIG. 8 is a flowchart illustrating a procedure of the contents distribution management system having the multi-service type management function upon elimination of a service in accordance with an embodiment of the present invention.

FIG. 8 is a flowchart illustrating one embodiment of a procedure of the contents distribution management system having the multi-service type management function upon elimination of a service in accordance with the present invention.

First of all, the manager should provide information on a name of service to be eliminated upon elimination of a service in the contents distribution management system.

When the contents distribution management system receives a demand for service elimination, it eliminates one specific row from the CSPT with reference to the name information provided from the manager at step S810.

At this time, the row to be eliminated is a row with a same service name field value using the service name information among the information provided from the manager.

Thereafter, the contents distribution management system also eliminates, from the SMT, a row having the same service name field value as the eliminated service name in the CSPT at step S820.

At a following step S830, the contents distribution management system eliminates a directory having the corresponding service name from the local contents caches 25*l* to 25*m* within the local servers 24*l* to 24*m*.

If the local servers 24*l* to 24*m* are consisted in the cluster form, the contents distribution management system repeatedly carries out the directory elimination process made in step S830 with respect to each node constituting the cluster.

As described above, if the contents distribution management system receives the demand for elimination of specific service type, it eliminates rows corresponding to the demanded service type from the table managed by the local servers 24*l* to 24*m* in a lump.

Figure 9:
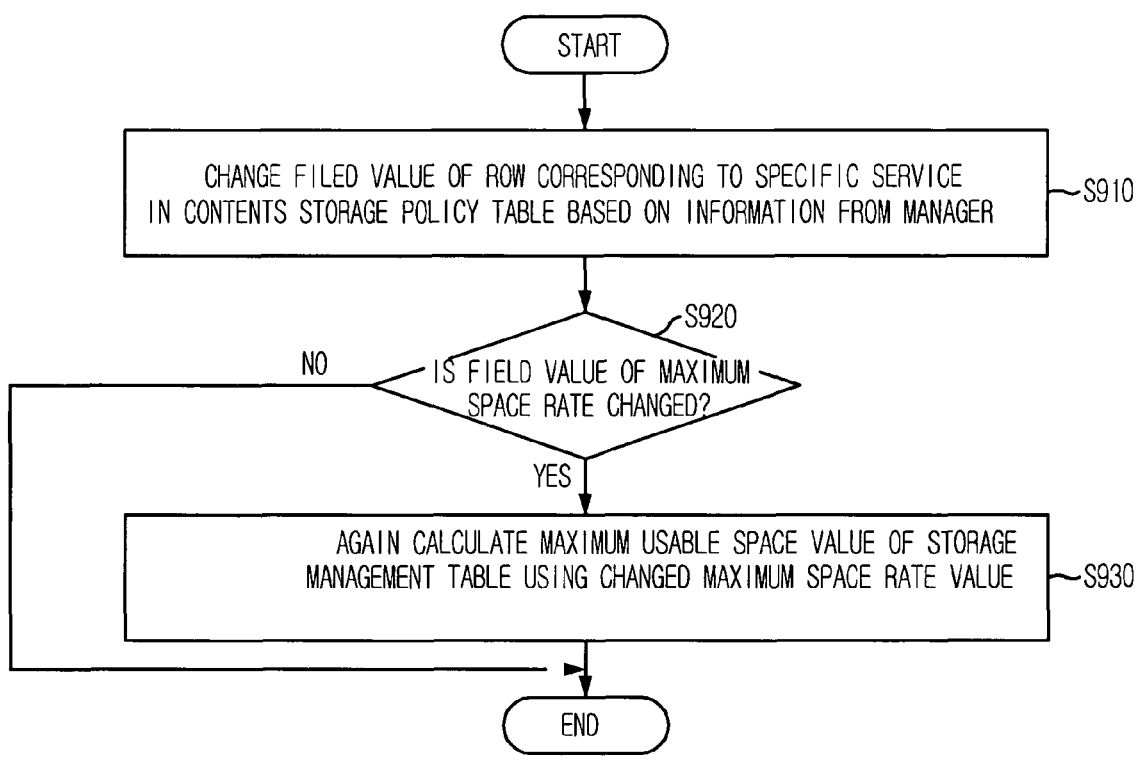
FIG. 9 is a flowchart showing a procedure of the contents distribution management system having the multi-service type management function upon change of a service in accordance with an embodiment of the present invention.

FIG. 9 is a flowchart showing one embodiment of a procedure of the contents distribution management system having the multi-service type management function upon change of a service in accordance with the present invention.

Firstly, the manager should provide all required information for the CSPT upon change of a service in the contents distribution management system.

After that, when the contents distribution management system receives a demand for service change from the end user, it changes field values of a row corresponding to a service name in the CSPT using the service name contained in the information from the manager and characteristics of the service to be changed upon service execution at step S910.

Subsequently, the contents distribution management system judges at step S920 whether or not the maximum space rate field is involved in the fields of the changed values.

If it is judged at step S920 that the maximum space rate field is involved in the fields of the changed values, then as in step S930, the contents distribution management system newly calculates and sets a maximum usable space of the service with the corresponding service name in the SMT using the changed maximum space rate value, in the same manner as that presented in FIG. 7.

Figure 10A:
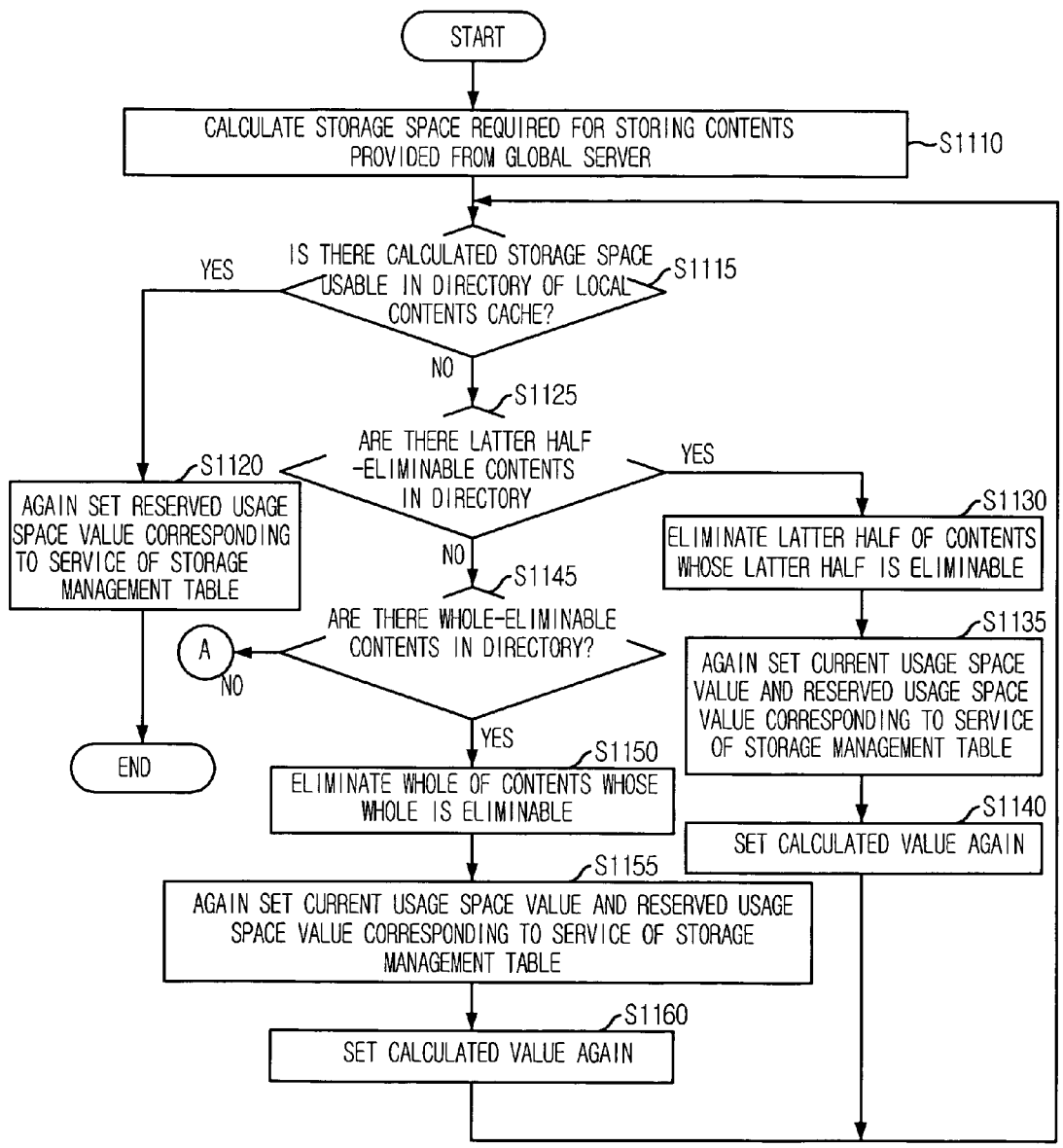
FIGS. 10a and 10b are flowcharts showing a procedure of the contents distribution management system having the multi-service type management function upon elimination of contents in accordance with an embodiment of the present invention.
Figure 10B:
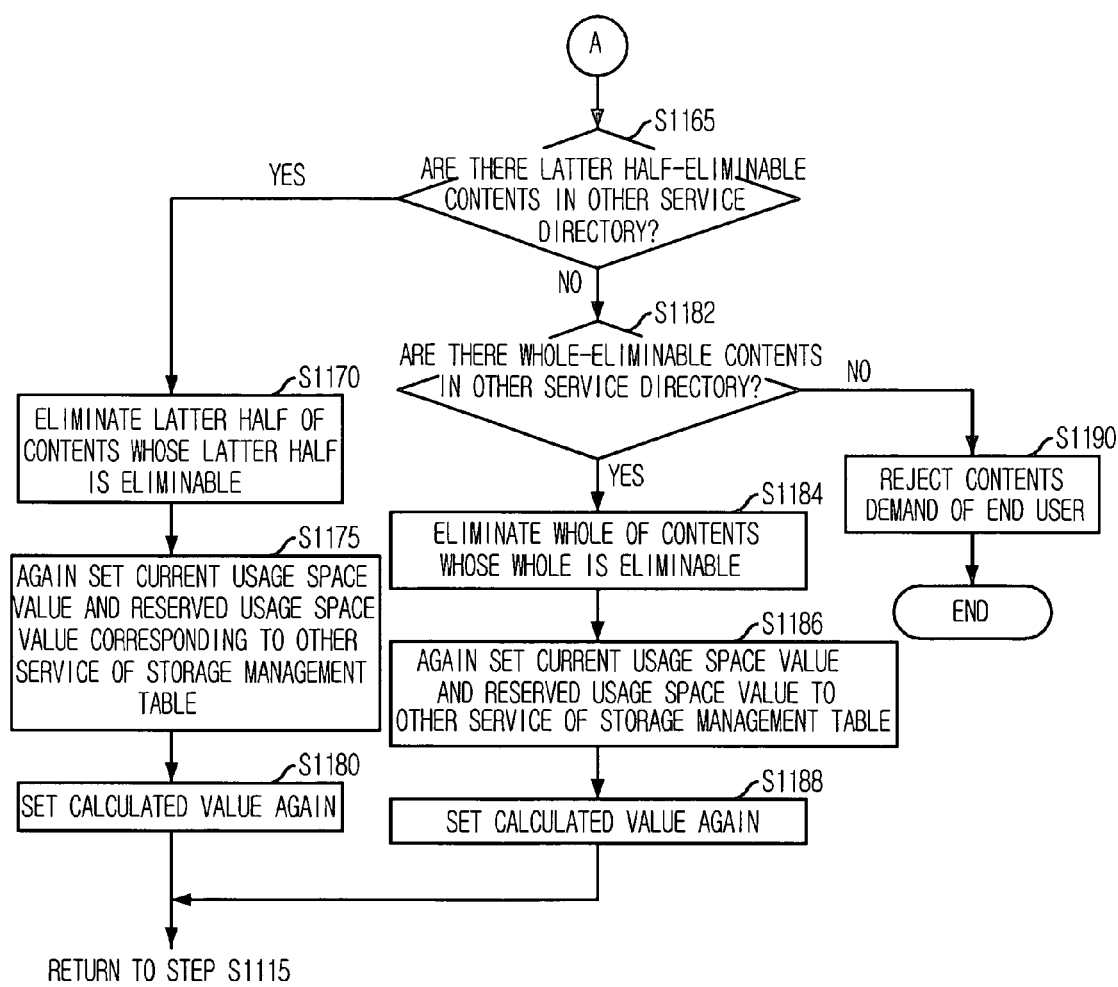

FIGS. 10a and 10b are flowcharts showing one embodiment of a procedure of the contents distribution management system having the multi-service type management function upon elimination of contents in accordance with the present invention.

The local servers 24l to 24m, in response to a service demand from the end user having the contents display stations 27l to 27L, inquire whether or not corresponding contents exist in the local contents caches 25l to 25m.

As a result of the inquiry, if there exists only the head part of the contents or no related contents in the local contents caches 25l to 25m, the local servers 24l to 24m demand the global servers 20l to 20n to transmit the remainder or whole of the contents.

At this time, the contents distribution management system eliminates the contents stored in the local contents caches 25l to 25m to secure the required space in storing the contents to be provided from the global servers 20l to 20n.

In such a case, the processes where the contents distribution management system eliminates the contents stored in the local contents caches 25l to 25m and changes the table based on the elimination are as follows.

Firstly, when the local servers 24l to 24m get a demand for service, they compute a storage space required for storing the contents provided from the global servers 20l to 20n at step S1110.

If the corresponding contents are not in the local contents caches 25l to 25m at all, the required storage space corresponds to a whole capacity of contents from the global servers 20l to 20n; and if the head portion of the contents is stored in the local contents caches 25l to 25m, the required storage space corresponds to a capacity of the remaining latter half of the contents from the global servers 20l to 20n.

At a next step S1115, the contents distribution management system judges using the SMT information whether or not the computed storage space is usable in a directory of the local contents caches 25l to 25m with which the contents from the global servers 20l to 20n are stored.

As a result of the judgment at step S1115, if the computed storage space is secured in the directory of the local contents caches 25l to 25m, the contents distribution management system increases the reserved usage space corresponding to the relevant service of the SMT by the computed storage space and then ends the contents elimination process after storing the same at step S1120.

Meanwhile, if the computed storage space is not secured in the directory of the local contents caches 25l to 25m, the contents distribution management system again judges using the LCT information at step S1125 whether or not latter half-eliminable contents exist in the directory of the local contents caches 25l to 25m with which the contents provided are stored.

As a result of the judgment at step S1125, if the latter half-eliminable contents exist in the LCT, the contents distribution management system selects one contents and eliminates the latter half of the selected contents based on the elimination policy with respect to the related service of the CSPT at step S1130.

Further, the contents distribution management system decreases the current usage space and the reserved usage space field values corresponding to the service by the amount of the eliminated latter half of the contents and then stores it in the SMT at step S1135; and also decreases the storage space or the computed storage space required for storing the contents from the global servers 20l to 20n by the amount of the eliminated latter half of the contents at step S1140.

Thereafter, the contents distribution management system returns to step S1115 that judges using the SMT information whether or not the storage space required for storing the contents from the global servers 20l to 20n, which has been reduced by the latter half capacity of the eliminated contents, is secured in the directory of the local contents caches 25l to 25m.

As a result of the judgment at step S1125, if the latter half-eliminable contents are not in the directory of the local contents caches 25l to 25m, the contents distribution management system again judges at step S1145 whether or not whole-eliminable contents exist in the same manner as that in the process that judges the presence of the latter half-eliminable contents.

If the whole-eliminable contents exist in the directory of the local contents caches 25l to 25m at step S1145 above, the contents distribution management system selects one contents based on the elimination policy with respect to the related service of the CSPT and then eliminates the whole of the selected contents at step S1150.

Further, the contents distribution management system decreases the current usage space and the reserved usage space field values by the whole amount of the eliminated contents in the SMT and then stores it in the SMT at step S1155; and also decreases the required storage space or computed storage space by the amount of the eliminated contents at step S1160.

Subsequently, the contents distribution management system returns to step S1115 that judges using the SMT information whether or not the storage space required for storing the contents from the global servers 20l to 20n, which has been reduced by the whole amount of the eliminated contents, is guaranteed in the directory of the local contents caches 25l to 25m.

Meanwhile, as a result of the judgment at step S1145, if the whole-eliminable contents are not in the directory of the local contents caches 25l to 25m, the contents distribution management system again judges at step S1165 whether or not the latter half-eliminable contents exist in a service directory other than the service for which the received contents are stored.

If the latter half-eliminable contents exist in the other service directory of the local contents caches 25l to 25m, the contents distribution management system selects one contents based on the elimination policy with respect to the related service of the CSPT and then eliminates the latter half of the selected contents at step S1170.

Further, the contents distribution management system decreases the current usage space and the reserved usage space field values corresponding to the other service by the amount of the eliminated latter half and then stores it in the SMT at step S1175; and also decreases the required storage space or computed storage space by the amount of the eliminated latter half at step S1180.

Subsequently, the contents distribution management system returns to step S1115 that judges using the SMT information whether or not the required storage space is secured in the directory of the local contents caches 25*l* to 25*m* with which the received contents are stored.

If it is judged at step S1165 that the latter half-eliminable contents are not presented in the other service directory of the local contents caches 25*l* to 25*m*, the contents distribution management system judges at step S1182 whether or not whole-eliminable contents exist in the same manner as that of the process that judges the presence of the latter half-eliminable comments.

As a result of the judgment at step S1182, if the whole-eliminable contents exist in the other service directory of the local contents caches 25*l* to 25m, the contents distribution management system selects one contents based on the elimination policy with respect to the other service directory of the CSPT and then eliminates the whole of the selected contents at step S1184.

Further, the contents distribution management system decreases the current usage space and the reserved usage space field values by the whole amount of the eliminated contents in the SMT and then stores it in the SMT at step S1186; and also decreases the required storage space or computed storage space by the whole amount of the eliminated contents at step S1188.

And then, the contents distribution management system returns to step S1115 that judges using the SMT information whether or not the required storage space is secured in the directory of the local contents caches 25*l* to 25*m* with which the received contents are stored.

However, as a result of the judgment at step S1182, if the eliminable contents are not presented in the other service directory of the local contents caches 25*l* to 25*m*, the contents distribution management system rejects the contents demand of the end user at step S1190 and then ends the process since it is under the state that the storage space guarantee for storing the contents from the global servers 20*l* to 20*n* is difficult.

Meanwhile, when the end user having the contents display stations 27*l* to 27L is intended to demand a service of specific contents, if the local servers 24*l* to 24*m* to be serviced don't have the whole or head part of the contents, the end user cannot receive the service until the local servers 24*l* to 24*m* carry at least head part of the relevant contents in the local contents caches 25*l* to 25*m* of the corresponding local servers 24*l* to 24*m* via the global servers 20*l* to 20*n*.

In order to efficiently cope with the above circumstances, the contents distribution management system of the invention allows the local servers 24*l* to 24*m* to automatically receive the head part of the contents in coincidence with a specific condition transmitted from the global servers 20*l* to 20*n* in advance and then store it in the local contents caches 25*l* to 25*m*.

The process where the local servers 24*l* to 24*m* receive the head part of the contents in coincide with the specific condition from the global servers in advance and then store the same in the local contents caches 25*l* to 25*m* as mentioned above will be described in more detail with reference to FIG. 11.

Figure 11:
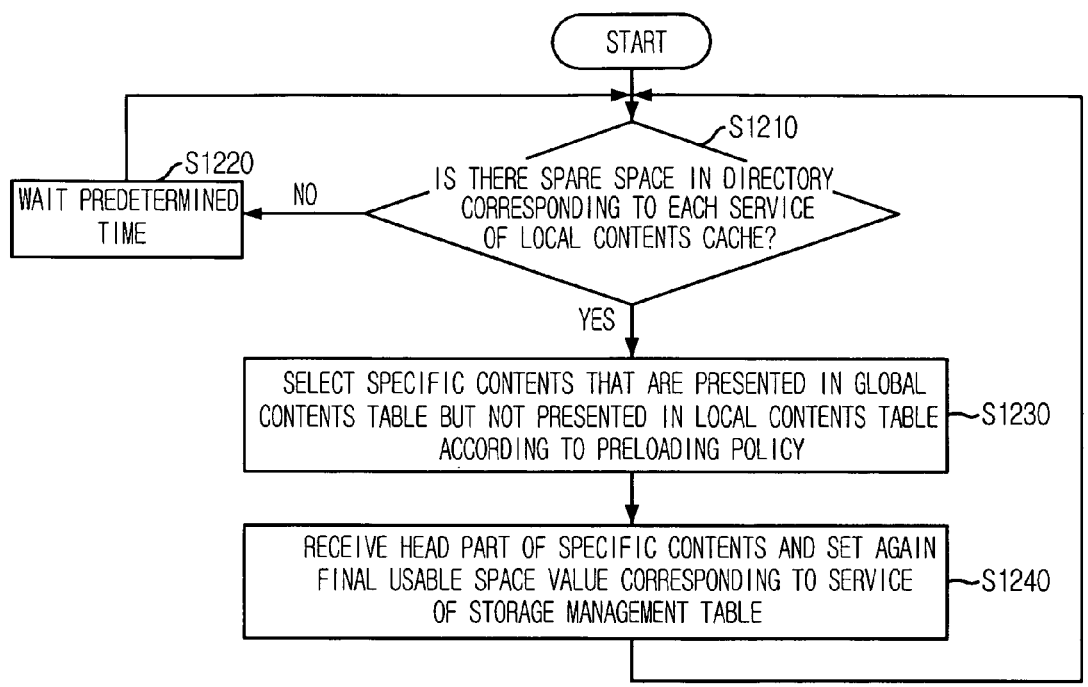
FIG. 11 is a flowchart showing a procedure of preloading a head part of contents in the contents distribution management system having the multi-service type management function in accordance with an embodiment of the present invention.

FIG. 11 is a flowchart showing one embodiment of a procedure of preloading a head part of contents in the contents distribution management system having the multi-service type management function in accordance with the present invention.

First of all, the local servers 24*l* to 24*m* hoping the preloading of the head part of the contents judges at step S1210 whether or not there exists a spare space required for storing the head part of contents every service with reference to the SMT.

If it is judged at step S1210 that the spare space is not in a directory corresponding to each service of the local contents caches 25*l* to 25*m*, the process of the invention waits for a predetermined time at step S1220 since the preloading of the head part of the contents can be no longer performed.

After passing the predetermined time, the process returns to step S1210 that judges whether or not the spare space required for storing the head part of contents exists in the directory corresponding to each service of the local contents caches 25*l* to 25*m*.

In the meantime, if it is judged at step S1210 that the spare space exists in the directory corresponding to each service of the local contents caches 25*l* to 25*m*, the process selects contents that exist in the GCT of the local servers but are not in the LCT according to the preloading policy of the CSPT at step S1230.

Thereafter, the process demands the head part of the selected contents of the global servers and then increases the reserved usage space field values by the head part of the contents in the row corresponding to the relevant service of the SMT at step S1240.

And then, the process returns to step S1210 that judges whether or not the spare space required for storing the head part of contents exists in the directory corresponding to each service of the local contents caches 25*l* to 25*m*.

As described above, the local servers 24*l* to 24*m* of the invention can receive contents provided from the global servers 20*l* to 20*n* by managing the contents in the form of the tables such as the GCTs 29*l* to 29*m*, the LCTs 23*l* to 23*m*, the CSPT and the SMT. Furthermore, the global servers 20*l* to 20*n* also can maximize the usability by servicing their own contents libraries 21*l* to 21*n* to the local servers 24*l* to 24*m*, without servicing their own contents libraries 21*l* to 21*n* to only one of the local servers 24*l* to 24*m*.

Moreover, the invention can perform an optimized storage space management for each policy that depends on various circumstances since it can designate its own service policy by managing the contents in the form of the tables and also the local servers 24*l* to 24*m* can designate the management policy of their own local contents caches 25*l* to 25*m* based on the service policy of the global servers 20*l* to 20*n* and a type of various contents.

The method of the present invention as described above may be implemented by a software program and stored in a computer-readable manner in a storage medium such as CD-ROM, RAM, ROM, floppy disk, hard disk, optical magnetic disk, or the like. This process may be readily carried out by those skilled in the art; and therefore, details of thereof are omitted here.

The present application contains subject matter related to Korean patent application No. 2004-108973, filed with the Korean Intellectual Property Office on Dec. 20, 2004, the entire contents of which are incorporated herein by reference.

While the present invention as been described with respect to the particular embodiments, it will be apparent to those skilled in the art that various changes and modifications may be made without departing from the spirit and scope of the invention as defined in the following claims.

What is claimed is:

1. A contents distribution management system with a multi-service type management function, the system comprising:
 a plurality of global servers for supplying contents to a plurality of local servers, each global server having a large capacity contents library; and
 the local servers for managing the contents provided from the global servers based on global servers and service types using contents tables, and providing a contents service in response to a contents streaming service demand from a last terminal using a local contents cache, wherein when the service demand is the addition of a service, adding one row or one directory to each of a contents storage policy table, a local contents cache and a storage management table;

wherein when the service demand is the elimination of a service, eliminating a corresponding one row or one directory from each of the contents storage policy table, the local contents cache and the storage management table;

wherein when the service demand is a change of the service, changing field values of a corresponding row in each of the contents storage policy table, and the storage management table;

wherein contents of the global servers demanded from the last terminal being managed using predetermined rules to provide an available storage space in the local content cache for the demanded contents, the demanded contents having a required storage space and a service type, the predetermined rules comprising:

eliminating, when the available storage space is less than the required storage space, contents from the local contents cache are eliminated in accordance to a purging priority policy based on both the service type and a priority ranking wherein the purging priority uses a least recently used algorithm to select contents in the local contents cache that are not used for a longest period of time, a usage frequency algorithm that selects least served contents in the local contents cache, and an age algorithm that selects contents in the local contents cache installed before a longest time;

choosing contents to be transmitted from the global servers in advance of the local servers by using a rank policy and a newage policy wherein the rank policy selects contents as a function of a highest usage frequency of the global servers and as a function of different profit structures of the global servers wherein the newage policy selects contents most recently installed in the system; and subsequently updating the available storage space in the local content cache.

2. The system as recited in claim 1, wherein each of the global servers include a first global contents table for managing the contents to be offered to the local servers.

3. The system as recited in claim 1, wherein each of the local servers include:
a second global contents table for managing information on specific contents to be serviced to the last terminal comprising information associated with the contents acquired from the global servers;
a local contents table for managing the contents stored in the local contents cache;
a contents storage policy table for managing the stored contents comprising identifications (IDs) of the global servers that have provided the contents stored in the local contents cache, and service types of the stored contents; and
a storage management table for managing a storage space of the local contents cache.

4. The system as recited in claim 3, wherein the local servers are extended in a cluster manner.

5. The system as recited in claim 3, wherein the global contents table contains the global server identification (ID), a contents ID, a contents title, a contents storage location in each global server, a contents release date, a final contents file size, the service type of contents, a usage trend of contents, a bit rate, and a running time.

6. The system as recited in claim 3, wherein the local contents table contains the global server ID, a contents ID, a node ID for identifying a specific node in a cluster if the local server is made in the cluster form, a contents storage location in the local server or node in case of cluster, a current contents state, a last access time, a time stored in the local server, a total number of services, the number of current simultaneous accesses, a final original contents file size, a current contents file size in each local contents cache in the cluster form, and the service type of contents.

7. The system as recited in claim 3, wherein the contents storage policy table contains a service name, the global server ID, the service type, an elimination or purging policy to eliminate contents based on the predetermined rules, a placement policy to place contents based on the predetermined rules if the local server is made in a cluster form, a preloading policy to preload a part of contents, and a maximum space rate to represent a maximal usable space in a total storage space available in the local server.

8. The system as recited in claim 3, wherein the storage management table contains a service name, a node ID for identifying a specific node in a cluster if the local server is in the cluster form, a current usage space, a reserved usage space including the amount of contents being transmitted, and a maximum usable space that is available for a demanded service.

9. The system as recited in claim 8, wherein the maximum usable space for the demanded service is computed by multiplying the entire space of the local contents cache by the maximum space rate of the contents storage policy table.

10. A multi-service type management method in a contents distribution management system, the method comprising the steps of:
(a) when an addition of a service is demanded, adding one row or one directory to each of a contents storage policy table, a local contents cache and a storage management table;
(b) when an elimination of a service is demanded, eliminating a corresponding one row or one directory from each of the contents storage policy table, and the local contents cache and the storage management table;
(c) when a change of the service is demanded, changing field values of a corresponding row in each of the contents storage policy table, and the storage management table;
(d) if contents demanded from a last terminal are not presented in the local contents cache, securing a space required by the local contents cache to receive the corresponding contents by eliminating contents from the local contents cache in accordance to a purging priority policy based on both a service type and a priority ranking when available storage space of the local contents cache is less than a required storage space of the demanded contents wherein the purging priority uses a least recently used algorithm to select contents in the local contents cache that are not used for a longest period of time. a usage frequency algorithm that selects least served contents In the local contents cache, and an age algorithm that selects contents in the local contents cache Installed before a longest time; and
(e) preloading a head part of contents to store the head part in the local contents cache by choosing contents to be transmitted from global servers in advance of local server by using a rank policy and a newage policy wherein the rank policy selects contents as a function of a highest usage frequency of the global servers and as a function of different profit structures of the global servers and the newage policy selects contents most recently installed in the system.

11. The method as recited in claim 10, wherein said step (a) includes the steps of:
   (a1) inserting one row corresponding to an additionally demanded service in the contents storage policy table and setting field values of the row;
   (a2) if a local server is a single node, creating one directory corresponding to a name of the added service in a local contents cache of the corresponding local server, or directories corresponding to the number of nodes if the local server is made in a cluster form; and
   (a3) if a local server is a single node, creating one row corresponding to a name of the added service in a storage management table, or rows corresponding to the number of nodes if the local server is in a cluster form, and setting field values of the row.

12. The method as recited in claim 11, wherein said step (a3) includes the steps of:
   (a31) setting field values of a current usage space and a reserved usage space of the storage management table to "0"; and
   (a32) setting an available maximal space field value to a value obtained by multiplying a whole space of the local contents cache by a maximum space rate of the contents storage policy table for the corresponding service of the storage management table.

13. The method as recited in claim 10, wherein said step (b) Includes the steps of:
   (b1) eliminating one row corresponding to the elimination-demanded service from the contents storage policy table;
   (b2) if the local server is a single node, eliminating one directory corresponding to a name of the elimination-demanded service, or directories corresponding to the number of nodes if the local server is made in a cluster form, from the local contents cache of the corresponding local server; and
   (b3) if the local server is a single node, eliminating one row corresponding to the elimination-demanded service, or rows corresponding to the number of nodes if the local server is in the cluster form, from the storage management table.

14. The method as recited in claim 10, wherein said step (c) includes the steps of:
   (c1) changing field values of the contents storage policy table based on information provided from a manager;
   (c2) confirming whether or not a filed value of maximum space rate is changed among the changed field values; and
   (c3) if the filed value of maximum space rate is changed, changing a maximum usable space field value of the storage management table.

15. The method as recited in claim 10, wherein said step (d) includes the steps of:
   (d1) calculating a space required by the local contents cache to receive contents;
   (d2) confirming whether or not the required space is secured in a directory corresponding to a related service of the local contents cache;
   (d3) if the required space is secured, increasing the reserved usage space field value of the storage management table by the required space;
   (d4) if the required space is not secured, confirming whether or not eliminable contents exist among the contents of the directory;
   (d5) if the eliminable contents exist among the contents of the directory, eliminating the corresponding contents based on a contents elimination policy of the contents storage policy table, decreasing the current usage space, the reserved usage space field value and the calculated space at said step (d1) by the amount of the eliminated contents, and returning to said step (d2);
   (d6) if the eliminable contents are not among the contents of the directory at said step (d4), confirming whether or not eliminable contents exist among contents of directory corresponding to other services in the local contents cache;
   (d7) if the eliminable contents exist among the contents of directory corresponding to the other services at said step (d6), eliminating the corresponding contents based on the elimination policy of the contents storage policy table, decreasing the current usage space, the reserved usage space field value and the calculated space at said step (d1) by the contents amount eliminated in the other services, and returning to said step (d2); and
   (d8) if the eliminable contents are not among the contents of directory corresponding to the other services at said step (d6), rejecting the contents demand of the last terminal.

16. The method as recited in claim 15, wherein each of said steps (d4) and (d6) includes the steps of:
   (d461) confirming whether or not latter half-eliminable contents exist;
   (d462) if the latter half-eliminable contents exist, eliminating the latter half of the contents;
   (d463) if the latter half-eliminable contents are not presented, confirming whether or not whole-eliminable contents exist; and
   (d464) if the eliminable whole contents exist, eliminating the whole of the contents.

17. The method as recited in claim 10, wherein said step (e) includes the steps of:
   (e1) confirming whether or not a spare space exists In the local server;
   (e2) if the spare space is not in the local server, returning to said step (e1) after waiting for a predetermined time;
   (e3) if the spare space is in the local server, selecting contents that exist in the global contents table but are not in the local contents table; and
   (e4) when a head part of the selected contents is demanded and received, increasing the reserved usage space field value of the corresponding service by the head part of the received contents in the storage management table.

18. The system as recited in claim 1, wherein the predetermined rules further comprise:
   eliminating, when the available storage space is less than the required storage space, half-eliminable contents associated with the service type of the demanded contents from the local contents cache in accordance to the purging priority policy and subsequently updating the available storage space;
   eliminating, when the available storage space is less than the required storage space, whole-eliminable contents associated with the service type of the demanded contents from the local contents cache in accordance to the purging priority policy and subsequently updating the available storage space;
   eliminating, when the available storage space is less than the required storage space, half-eliminable contents associated with an another service type from the local contents cache in accordance to the purging priority policy and subsequently updating the available storage space;

eliminating, when the available storage space is still less than the required storage space, whole-eliminable contents associated with the another service type from the local contents cache in accordance to the purging priority policy and subsequently updating the available storage space storing, when the available storage space is greater than or equal to the required storage space, the demanded content into the local contents caches for contents streaming service to the last terminal.

19. The system as recited in claim 1 wherein when the service type is a movie service type then the purging priority policy uses a Least Recently Used (LRU) priority ranking, and when the service type is a news service type then the purging priority policy uses an age dependent priority ranking.

20. The method as recited in claim 10 wherein when the service type is a movie service type then the purging priority policy uses a Least Recently Used (LRU) priority ranking, and when the service type is a news service type then the purging priority policy uses an age dependent priority ranking.

\* \* \* \* \*